(12) United States Patent
Zhao et al.

(10) Patent No.: US 9,372,573 B2
(45) Date of Patent: Jun. 21, 2016

(54) ARRAY SUBSTRATE, TOUCH PANEL AND DRIVING METHOD THEREOF

(71) Applicant: BOE TECHNOLOGY GROUP CO., LTD., Beijing (CN)

(72) Inventors: Jiayang Zhao, Beijing (CN); Yuanbo Zhang, Beijing (CN); Wei Qin, Beijing (CN); Xiangxiang Zou, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/369,437

(22) PCT Filed: Dec. 6, 2013

(86) PCT No.: PCT/CN2013/088720
§ 371 (c)(1),
(2) Date: Jun. 27, 2014

(87) PCT Pub. No.: WO2014/190711
PCT Pub. Date: Dec. 4, 2014

(65) Prior Publication Data
US 2014/0354572 A1    Dec. 4, 2014

(30) Foreign Application Priority Data
May 31, 2013    (CN) .......................... 2013 1 0211448

(51) Int. Cl.
*G09G 3/36* (2006.01)
*G06F 3/041* (2006.01)

(52) U.S. Cl.
CPC ............ *G06F 3/0416* (2013.01); *G06F 3/0412* (2013.01)

(58) Field of Classification Search
CPC .............................. G06F 3/03547; G06F 3/044
USPC .................................................. 345/173–174
See application file for complete search history.

(56) References Cited

U.S. PATENT DOCUMENTS

| 2007/0030255 A1* | 2/2007 | Pak et al. .................. 345/173 |
| 2010/0194698 A1* | 8/2010 | Hotelling et al. ......... 345/173 |
| 2012/0249444 A1  | 10/2012 | Lee et al. |

FOREIGN PATENT DOCUMENTS

| CN | 201993737 U | 9/2011 |
| CN | 102736291 A | 10/2012 |

(Continued)

OTHER PUBLICATIONS

International Search Report Appln. No. PCT/CN2013/088720; Issued Feb. 27, 2014.

(Continued)

*Primary Examiner* — Roy Rabindranath
(74) *Attorney, Agent, or Firm* — Ladas & Parry LLP

(57) ABSTRACT

An array substrate, a touch panel and a driving method thereof, and a display device are disclosed. The array substrate comprises a base substrate (1) which is formed with gate lines, data lines (8), first common electrodes (5) and second common electrodes (6) thereon, and the second common electrodes (6) comprise: transverse electrode groups (601) located in the same row and metal jumper wires (302) connecting two adjacent transverse electrode groups (601) in the same row; the first common electrodes (5) comprise longitudinal electrode groups (501), and switch circuits (701, 702) are provided between the first common electrodes (5) and the data lines (8). At the touch scanning phase, the conduction of the switch circuits (701, 702) renders the parallel connection between the first common electrodes (5) and the data lines (8), and then results in the reduction of the equivalent resistance of the first common electrodes (5), and the signal-to-noise ratio of the first common electrodes (5) is indirectly enhanced, thus the present invention achieves more accurate monitoring of voltage signals coupled by touch sensing electrodes and precise positioning of a touch point.

15 Claims, 4 Drawing Sheets

(56) References Cited

FOREIGN PATENT DOCUMENTS

CN 103309534 A 9/2013
CN 203324955 U 12/2013

OTHER PUBLICATIONS

First Chinese Office Action Appln. No. 2013102114483; Issued Feb. 26, 2014.

First Chinese Office Action dated Feb. 26, 2014; Appln. No. 201310211448.3.

Second Chinese Office Action dated Oct. 24, 2014; Appln. No. 201310211448.3.

Chinese Notice of Allowance dated Dec. 22, 2014; Appln. No. 201310211448.3.

International Preliminary Report on Patentability issued Dec. 1, 2015; PCT/CN2013/088720.

* cited by examiner

US 9,372,573 B2

ARRAY SUBSTRATE, TOUCH PANEL AND DRIVING METHOD THEREOF

TECHNICAL FIELD

The embodiments of the present invention relate to an array substrate, a touch panel and a driving method thereof, and a display device.

BACKGROUND

With fast developments of display technologies, touch screen panels have been gradually popularized in people's life. Currently, according to working principles, touch panels can be divided into a resistance type, a capacitive type, an infrared ray type and a surface acoustic wave type. The capacitive type in-cell touch panel is very popular with the industry due to its distinct touch principle and advantages such as high sensitivity, long service life, high light transmittance and etc.

Traditional capacitive type in-cell touch panels are achieved through directly providing additional touch scanning lines and touch sensing lines on a TFT (Thin Film Transistor) array substrate, that is, two layers of strip ITO electrodes crossing each other at different planes are fabricated at the surface of the TFT array substrate, and the two layers of ITO (Indium Tin Oxides) electrodes respectively serve as the touch scanning lines and the touch sensing lines of the touch panel, and a sensing capacitance is formed at the intersection of different planes of two strip ITO electrodes. When a human body touches the touch panel, the capacitance value of the sensing capacitance changes, then the voltage signal coupled by the touch sensing lines is changed, and the position of the touch point can be determined according to changes of the voltage signal.

The manner of fabricating two layers of strip ITO electrodes crossing each other at different planes at the surface of the TFT array substrate will increase the thickness of the TFT array substrate, needs additional power to drive the touch structure and decreases the transmittance of the array substrate.

Currently, it becomes a mainstream research direction in the industry that the elements in a current display panel are multiplexed and made to achieve a touch function.

FIG. 1 is a structural schematic diagram of the array substrate provided by the prior art, and FIG. 2 is a partial enlarged view of structure A shown in FIG. 1. As shown in FIGS. 1 and 2, the array substrate comprises a base substrate plate 1 on which several common electrode bases 4 are formed. The common electrode bases 4 are grouped in a manner of connecting the common electrode bases 4 through a common electrode line (Vcom line), and the common electrode bases 4 are divided into a transverse electrode group and a longitudinal electrode group. The common electrode line comprises a transverse electrode line 301 (H-Vcom line) and a longitudinal electrode line 201 (V-Vcom line). A longitudinal electrode group is formed between two transverse electrode groups adjacent to each other in the transverse direction, two transverse electrode groups adjacent to each other in the longitudinal direction are circuit broken therebetween, and at least one transverse electrode group is formed between two adjacent longitudinal electrode groups. The transverse electrode groups adjacent to each other in the transverse direction can be connected with each other through a metal jumper wire 302 to form a horizontal common electrode 3, the longitudinal electrode groups in the longitudinal direction separately constitute a vertical common electrode 2, and the metal jumper wire 302 bypasses the vertical common electrode 2.

At a display scan phase, the horizontal common electrode 3 and the vertical common electrode 2 cooperate with pixel units to achieve a display function.

At a touch scanning phase, one of the horizontal common electrode 3 and the vertical common electrode 2 is used as a touch scanning line and the other one is used as a touch sensing line. The metal jumper wire 302 in the horizontal common electrode 3 forms a sensing capacitance with the common electrode bases 4 or the horizontal electrode line 201 in the vertical common electrode 2 at the place where they cross. When a human body touches, the capacitance value of the sensing capacitance changes, then the voltage signals coupled by the touch sensing line are changed, and the position of the touch point can be determined according to the changes of the voltage signals.

In addition, in the prior art, the two transverse electrode groups adjacent to each other in the transverse direction can also be connected with each other via a transverse electrode line 301 which bypasses the vertical common electrode 2. At the touch scanning phase, the transverse electrode line 301 forms a sensing capacitance with the common electrode bases 4 or the horizontal electrode line 201 in the vertical common electrode 2 at the place where they cross. When a human body touches, the capacitance value of the sensing capacitance changes, then the voltage signals coupled by the touch sensing line are changed, and the position of the touch point can be determined according to the changes of the voltage signals.

The existing technical solutions, however, have disadvantages. At the touch scanning phase, as the common electrode bases and the common electrode line are constituted by an ITO material, this results in a large resistance of the horizontal common electrode and the vertical common electrode and then a large resistance of the touch scanning line and the touch sensing line, and then does not help detect the voltage signals coupled by the touch sensing line, and then results in inaccurate positioning of the touch point.

SUMMARY

The embodiments of the present invention provide an array substrate, a touch panel and a driving method thereof, and a display device, and improve the technical solution of a large resistance of touch scanning electrodes and touch sensing electrodes, reduce the resistance of the touch scanning electrodes or the touch sensing electrodes, indirectly improve the signal-to-noise ratio of electrodes, thus achieve more accurate monitoring of voltage signals and precise positioning of the touch point.

In order to achieve the above purposes, the embodiment of the present invention provide an array substrate, comprising: a base substrate on which is provided with gate lines, data lines, first common electrodes and second common electrodes. The gate lines and the data lines define a plurality of pixel units each of which comprises a plurality of common electrode bases, and all of the common electrode bases are divided into a plurality of transverse electrode groups arranged in a row direction and a plurality of longitudinal electrode groups arranged in a column direction. The second common electrode comprises: the transverse electrode groups located in the same row and metal jumper wires connecting two adjacent transverse electrode groups in the same row. The first common electrode comprises the longitudinal electrode groups, and a switch circuit is provided between the first common electrode and the data line, which is turned on at a touch scanning phase so that the first common electrode and the data line is connected with each other in parallel.

Optionally, the switch circuit comprise: a first switch sub-circuit and a second switch sub-circuit. The first switch sub-circuit is connected with one end of the first common electrode and one end of the data line, and the second switch sub-circuit is connected with the other end of the first common electrode and the other end of the data line.

Optionally, the first switch sub-circuit comprises: at least one first switch transistor, a first terminal of the first switch transistor is connected with one end of the data line and a second terminal of the first switch transistor is connected with the first common electrode, and the gate of the first switch transistor is connected with a switch signal line for providing a start signal at the touch scanning phase; and the second switch sub-circuit comprises: at least one second switch transistor, a first terminal of the second switch transistor is connected with one end of the data line and a second terminal of the second switch transistor is connected with the first common electrode, and the gate of the second switch transistor is connected with the switch signal line.

Optionally, the data line comprise a first data line disposed corresponding to the first common electrode and a second data line disposed corresponding to the second common electrode, the first terminal of the first switch transistor is connected with one end of the first data line, and the first terminal of the second switch transistor is connected with the other end of the first data line.

Optionally, the first switch transistors correspond to the first data lines one by one, and the second switch transistors correspond to the first data lines one by one.

Optionally, the first switch sub-circuit is disposed on the base substrate or disposed in a driving circuit outside the base substrate, and the second switch sub-circuit is disposed on the base substrate or disposed in the driving circuit outside the base substrate.

Optionally, at the touch scanning phase, the first common electrodes serve as touch scanning electrodes, and the second common electrodes serve as touch sensing electrodes; or the first common electrodes serve as touch sensing electrodes and the second common electrodes serve touch scanning electrodes.

In order to achieve the above purposes, the embodiment of the present invention provides a touch screen, comprising: an array substrate and a color filter substrate disposed opposite to each other, and the array substrate uses the above array substrate.

In order to achieve the above purpose, the embodiment of the present invention provide a driving method of the touch panel, and the method comprises:

at the touch scanning phase, turning on the switch circuit is, such that the first common electrode is connected with the data line in parallel, and a touch scanning signal is applied on the first common electrode or the second common electrode; and at a display scan phase, turning off the switch circuit, such that the first common electrode is disconnected with the data line, a display scan signal scans the gate lines row by row, and the display scan signal is applied to a corresponding data line.

In order to achieve the above purposes, the present invention provides a display device which comprises the above touch panel.

In the technical solutions of the array substrate, the touch panel and the driving method thereof, and the display device provided by the present invention, the array substrate comprises a base substrate on which the gate lines, data lines, first common electrodes and second common electrodes are formed, and the first common electrode comprise: the transverse electrode groups located in the same row and metal jumper wires connecting two adjacent transverse electrode groups in the same row; and the second common electrode comprises the longitudinal electrode groups, and a switch circuit is provided between the first common electrode and the data line, which is turned on at a touch scanning phase so that the first common electrode and the data line are connected with each other in parallel. At the touch scanning phase, the switch circuit is turned on such that the first common electrode is connected with the data line in parallel and then the equivalent resistance of the first common electrode is reduced, the signal-to-noise ratio of the first common electrode is increased indirectly, thus, the monitoring on the voltage signals coupled by the touch sensing electrode is more accurate, and accurate positioning of the touch point can be achieved.

BRIEF DESCRIPTION OF THE DRAWINGS

In order to clearly illustrate the technical solutions of the embodiments of the invention, the drawings of the embodiments will be briefly described in the following. It is obvious that the described drawings are only related to some embodiments of the invention and thus are not limitative of the invention.

EXPLANATION OF THE REFERENCE SIGNS OF THE FIGURES

| | |
|---|---|
| 1—base substrate; | 2—vertical common electrode; |
| 201—longitudinal electrode line; | 3—horizontal common electrode; |
| 301—transverse electrode line; | 4—metal jumper wire; |
| 4—common electrode base; | 5—first common electrode; |
| 501—longitudinal electrode group; | 6—second common electrode; |
| 601—transverse electrode group; | 701—first switch sub-circuit; |
| 702—second switch sub-circuit; | 8—data lines; |
| 801—first data line; | 802—second data line; |
| 9—switch signal line. | |

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Unless otherwise defined, the technical terms or scientific terms used herein should be the general meanings understood by one having ordinary skills in the field of the present invention. The terms "first", "second" and similar terms used in the description and claims of this patent application do not represent any order, amount or importance, and just aim to differentiate different parts. Likewise, similar terms such as "one" or "a" do not represent limitation on amount while refer to at least one. Similar terms such as "including" or "containing" refer to that an element or article preceding the terms "including" or "containing" covers the elements, articles and equivalents thereof listed after the terms "including" or "containing", and do not exclude other elements or articles. Similar terms such as "connect" or "couple" are not limited to physical or mechanical connections, and can comprise electrical connection, no matter direct or indirect. Terms such as "upper", "lower", "left" and "right" are only intended to represent relative position relationships, when the absolute position of a described object is changed, the relative position relationships may be changed correspondingly.

In order that one skilled in the art can better understand the technical solutions of the present invention, a detailed description of the array substrate, the touch panel and the driving method thereof, and the display device provided by the present invention will be made hereinafter in combination with the drawings.

The First Embodiment

Figure 1:
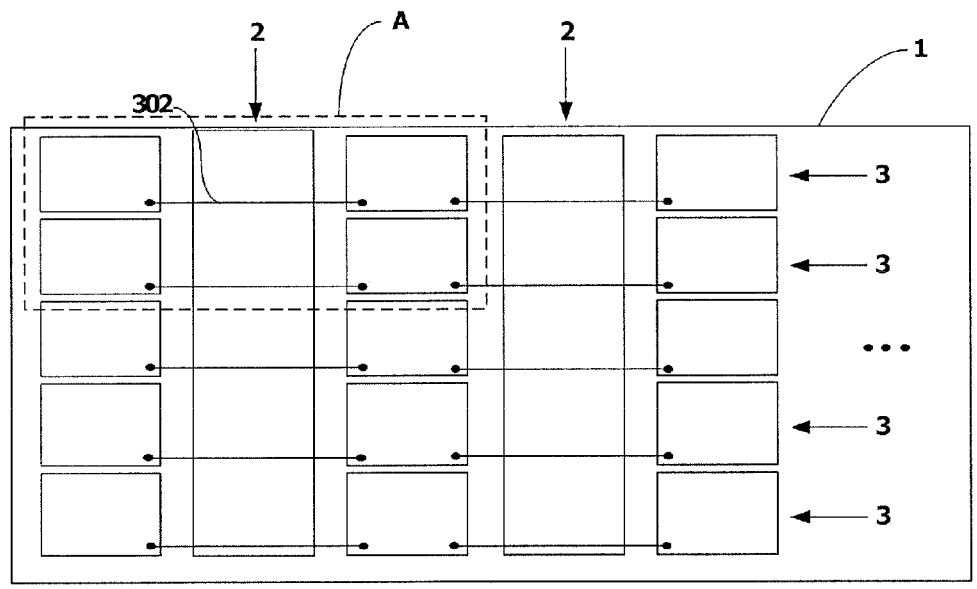
FIG. 1 is a structure schematic diagram of the array substrate provided by the prior art.
Figure 2:
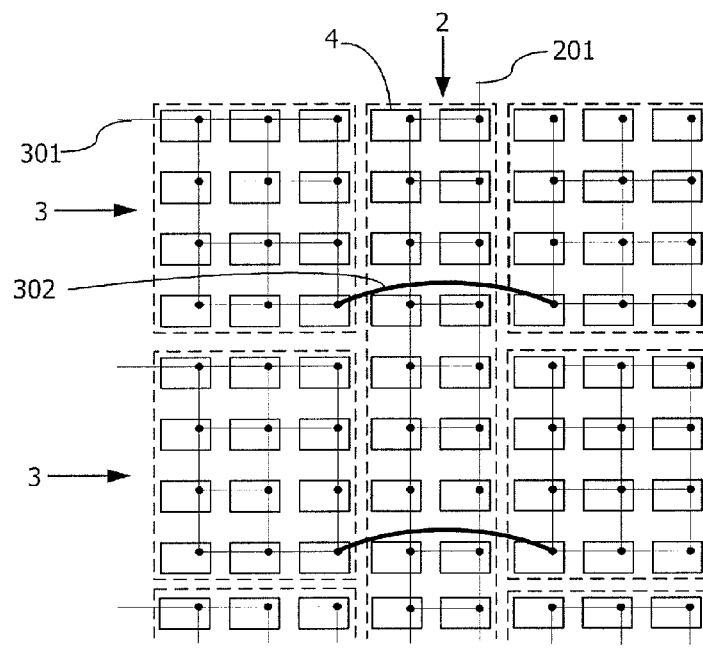
FIG. 2 is a partial enlarged diagram of the structure A as shown in FIG. 1.
Figure 3:
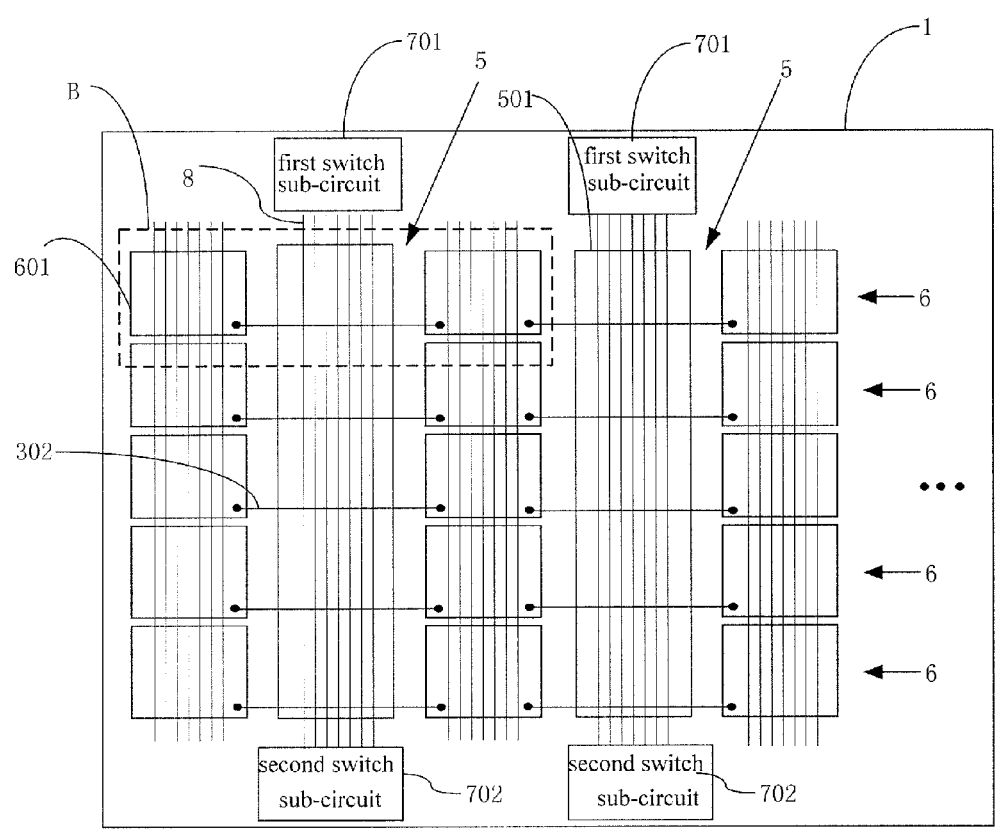
FIG. 3 is a structure schematic diagram of the array substrate provided by the first embodiment of the present invention.
Figure 4:
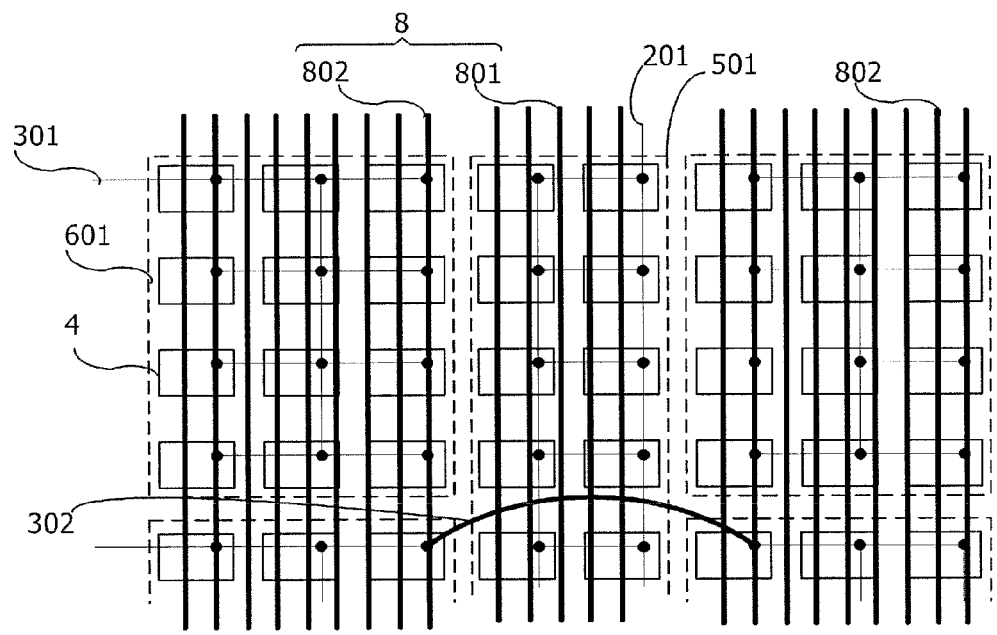
FIG. 4 is a partial enlarged diagram of the structure B as shown in FIG. 3.

FIG. 3 is a structure schematic diagram of the array substrate provided by the first embodiment of the present invention, and FIG. 4 is a partial enlarged diagram of the structure B shown in FIG. 3. As shown in FIGS. 3 and 4, the array substrate comprises: a base substrate 1 on which gate lines, data line 8, first common electrode 5 and second common electrode 6 are formed. The gate lines and the data lines 8 define pixel units each of which comprises corresponding common electrode bases 4. All of common electrode bases 4 are divided into a plurality of transverse electrode groups 601 arranged in a row direction and a plurality of longitudinal electrode groups 501 arranged in a column direction. The second common electrode 6 comprises the transverse electrode groups 601 in the same row and metal jumper wires 302 connecting two adjacent transverse electrode groups 601 in the same row. The first common electrode 5 comprises the longitudinal electrode group 501. A switch circuit is provided between the first common electrode 5 and the data line 8, and is conducted at a touch scanning phase so that the first common electrode 5 and the data line 8 are connected with each other in parallel.

The gate lines and the pixel units are not shown in the drawings. The first common electrode 5 comprises the longitudinal electrode group 501 which comprise the common electrode bases 4 and a common electrode line connecting the common electrode bases 4. The second common electrode 6 comprises the transverse electrode groups 601 and the metal jumper wires 302. The transverse electrode groups 601 comprise the common electrode bases 4 and the common electrode line connecting the common electrode bases 4, wherein the common electrode line comprises a longitudinal electrode line 201 and a transverse electrode line 301.

The pixel unit comprises TFT and pixel electrode, the gate line is connected with the gate of the TFT, the data line 8 is connected with the source of the TFT, and the pixel electrode is connected with the drain of the TFT. At a display scanning phase, the gate line scans row by row, so that the TFTs in one row are conducted and the pixel electrodes in this row conduct display under the control of corresponding data line.

Optionally, the switch circuit comprises a first switch sub-circuit 701 and a second switch sub-circuit 702. The first switch sub-circuit 701 is connected with one end of the first common electrode 5 and one end of the data line 8 respectively, and the second switch sub-circuit 702 is connected with the other end of the first common electrode 5 and the other end of the data line 8 respectively. The first common electrode 5 is provided with switch sub-circuits at two ends respectively, and the parallel connection structure of the first common electrode 5 and the data line 8 is achieved through the turn-on of the first switch sub-circuit 701 and the second switch sub-circuit 702.

Figure 5:
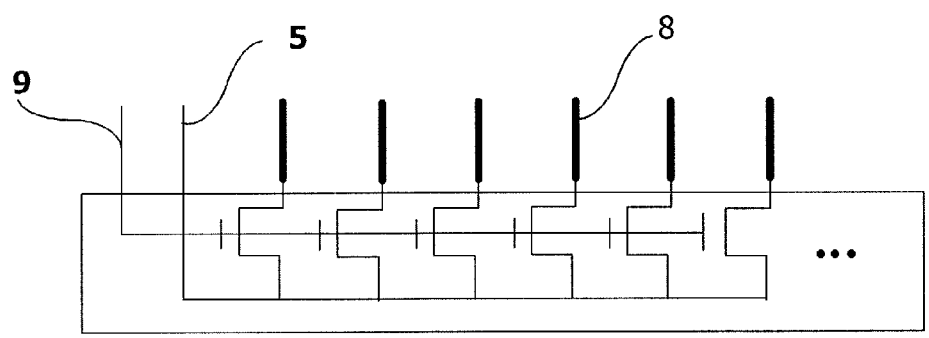
FIG. 5 is a structure schematic diagram of the first switch sub-circuit of the first embodiment of the present invention.

FIG. 5 is a structure schematic diagram of the first switch sub-circuit of the first embodiment of the present invention. As shown in FIG. 5, the first switch sub-circuit comprises: at least one first switch transistor, the first terminal of the first switch transistor is connected with one end of the data line 8 and the second terminal of the first switch transistor is connected with the first common electrode 5, and the gate of the first switch transistor is connected with a switch signal line 9 for providing a start signal at the touch scanning phase. The second switch sub-circuit comprises: at least one second switch transistor, the first terminal of the second switch transistor is connected with one end of the data line 8 and the second terminal of the second switch transistor is connected with the first common electrode 5, and the gate of the second switch transistor is connected with the switch signal line 9.

When the first switch sub-circuit comprises only one first switch transistor, all of the data lines 8 corresponding to the first common electrode 5 are connected with the first terminal of the first switch transistor, and the second terminal of the first switch transistor is connected with the first common electrode 5. This situation is not provided with corresponding drawings.

The first switch transistor and the second switch transistor can both be TFT, and then the gate of the TFT is connected with the switch signal line 9, the source is connected with the data line 8, and the drain is connected with the first common electrode 5, or the drain of the TFT is connected with the data line 8 and the source is connected with the first common electrode 5. Of course, other switch transistors can also be used to achieve the present invention, for example, MOS transistor and etc.

It should be noted that the second switch sub-circuit in the first embodiment of the present invention can also use the structure shown in FIG. 5.

Optionally, as shown in FIGS. 3 and 4, the data line 8 comprise a first data line 801 disposed corresponding to the first common electrode 5 and a second data line 802 disposed corresponding to the second common electrode. The first terminal of the first switch transistor is connected with one end of the first data line 801, and the first terminal of the second switch transistor is connected with the other end of the first data line 801.

Optionally, the first switch transistors correspond to the first data line 801 one by one, and the second switch transistors correspond to the first data line 801 one by one. There are a plurality of first data lines 801 disposed in the region corresponding to the first common electrode, the first switch sub-circuit 701 comprises a plurality of first switch transistors, the second switch sub-circuit 702 comprises a plurality of second switch transistors, and the two ends of each first data line 801 are connected with a corresponding first switch transistor and a corresponding second switch transistor respectively. When the first switch sub-circuit comprises a plurality of first switch transistors, each first switch transistor can correspond to one first data line 801.

Optionally, the first switch sub-circuit 701 can be disposed on the base substrate or be disposed in a driving circuit outside the base substrate; and the second switch sub-circuit 702 can be disposed on the base substrate 1 or be disposed in the driving circuit outside the base substrate. FIG. 3 shows the situation that the first switch sub-circuit 701 and the second switch sub-circuit 702 are both provided on the base substrate 1, and the drawings do not show the situation that the first switch sub-circuit 701 is provided in the driving circuit or the second switch sub-circuit 702 is provided in the driving circuit.

Optionally, at the touch scanning phase, the first common electrode 5 is the touch scanning electrode, and the second common electrode 6 is the touch sensing electrode; or the first common electrode 5 is the touch sensing electrodes and the second common electrode 6 is the touch scanning electrode. At the touch scanning phase, the first common electrode 5 is in parallel connection with the data line 8 and is touch scanning electrode, the second common electrode 6 is the touch sensing electrode, or, the first common electrode 5 in parallel connection with the data line 8 is the touch sensing electrode, and the second common electrode 6 is touch scanning electrode. More specifically, a sensing capacitance is formed at the place where the metal jumper wire 302 in the second common electrode 6 and the common electrode bases 4 in the first common electrode 5 cross. Or, a sensing capacitance is formed at the place where the metal jumper wire 302 in the second common electrode 6 and the longitudinal electrode line 201 in the first common electrode 5 cross. Or, a sensing capacitance is formed at the place where the metal jumper wire 302 in the second common electrode 6 and the data lines 8 in the first common electrode 5 cross. When a human body touches, the capacitance value of the sensing capacitance changes, then the voltage signals coupled by the touch sensing electrodes are changed, and the position of the touch point can be determined according to the changes of the voltage signals.

Figure 6:
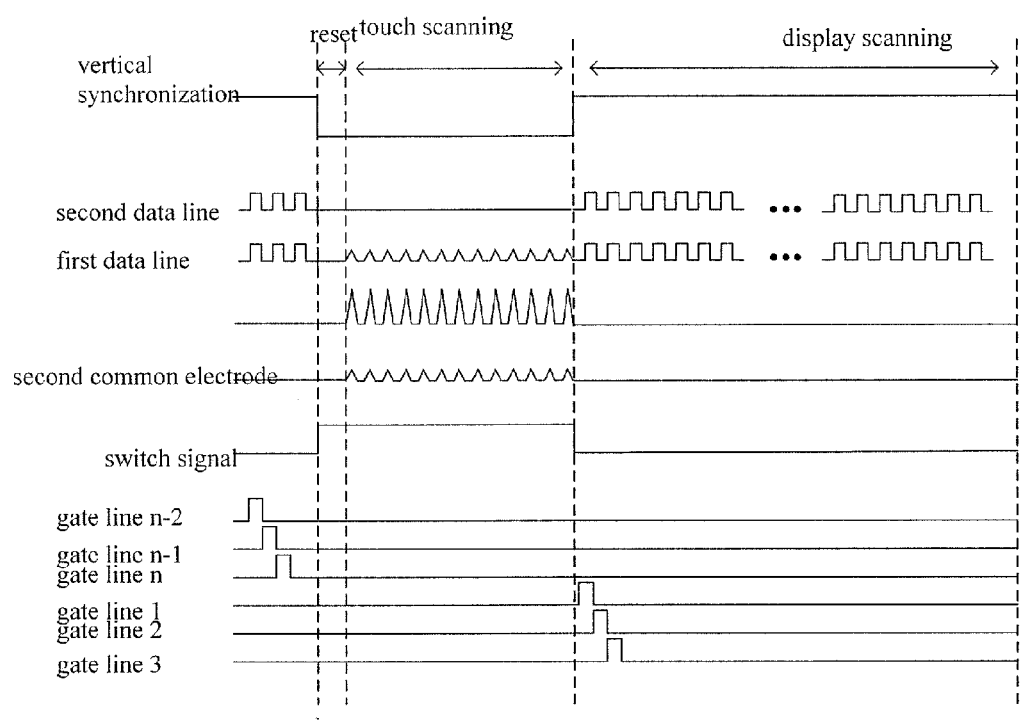
FIG. 6 is a time sequence diagram of the operation of the array substrate of the present invention.

FIG. 6 is a time sequence diagram of the operation of the array substrate of the present invention. As shown in FIG. 6, during scanning one frame, a scan signal can be divided into three parts, i.e., at a rest phase, at a touch scanning phase and at a display scan phase. At the reset phase, a vertical synchronization signal is changed from a high level to a low level, the switch signal is changed from a low level to a high level, that is, the turn-on of the switch circuit is achieved, and thereby the first common electrode and the data line are connected in parallel. Meanwhile, the first common electrode and the second electrode are not applied with a common voltage, and the data line is not applied with a data display signal, either. When a display scan signal has completed scanning the n$^{th}$ gate line, to prevent the voltage in the gate line from affecting the voltage signal at the touch scanning phase, the voltage signal in the gate line is reset. It should be note that, at the reset phase, the first data line, the second data line, the first common electrode and the second common electrode can be applied with a random direct current voltage signal or are not applied with any signal, and FIG. 6 only shows the situation of applying no signal at the reset phase. At the touch scanning phase, as the turn-on of the switch circuit is maintained, the first common electrode and the data line is connected in parallel with each other, the first common electrode in parallel connection with the data line serves as the touch scanning electrode or touch sensing electrode, and correspondingly the second common electrode serve as the touch sensing electrode or the touch scanning electrode. For example, when the first common electrode in parallel connection with the first data line serves as the touch scanning electrode and the second common electrode serve as the touch sensing electrode, the first data line and the first common electrode are applied with a touch scanning signal, and the second common electrode will couple a touch sensing signal having the same frequency with the touch scanning signal. When the touch panel is touched, the touch sensing signal coupled by the second common electrode changes, and the touch point can be positioned accurately through detecting the changed touch sensing signal. At the display scan phase, the vertical synchronization signal is changed from the low level to the high level, the switch signal is changed from the high level to the low level, that is, the switch circuit is turned off, the display scan signal starts scanning the gate lines row by row from the first row of gate lines, and the common voltage is applied to in the first common electrode and the second common electrode again, a data display signal is applied to the first data line and the second data line, and the data display signal controls the pixel electrodes to display. During actually driving the array substrate, the frequency of the data display signal applied to the first data lien or the second data line at the display scan phase usually is smaller than that of the touch scanning signal applied to the touch scanning electrode at the touch scanning phase.

For the array substrate provided by the first embodiment of the present invention, the switch circuit is provided between the first common electrodes and the data line, and is turned on at the touch scanning phase so that the first common electrodes and the data lines are connected with each other in parallel. At the touch scanning phase, the turn-on of the switch circuit renders the parallel connection between the first common electrodes and the data lines, and then results in the reduction of the equivalent resistance of the first common electrodes, and the signal-to-noise ratio of the first common electrodes is indirectly enhanced, thus the present invention achieves more accurate monitoring of voltage signals coupled by touch sensing electrodes and precise positioning of the touch point.

The Second Embodiment

The second embodiment of the present invention provides a touch panel comprising an array substrate and a color filter substrate disposed opposite to each other, and the array substrate is selected from the array substrate in the first embodiment 1. Please refer to the disclosure of the first embodiment for details, which are omitted herein.

The touch panel provided by the second embodiment of the present invention comprises the array substrate and the color filter substrate, wherein, array substrate comprises a base substrate, and the base substrate is formed with gate lines, data lines, first common electrodes and second common electrodes thereon, and the switch circuit is provided between the first common electrodes and the data lines, and is turned on at the touch scanning phase so that the first common electrodes and the data lines are connected with each other in parallel. At the touch scanning phase, the turn-on of the switch circuit renders the parallel connection between the first common electrodes and the data lines, and then results in the reduction of the equivalent resistance of the first common electrodes, and the signal-to-noise ratio of the first common electrodes is indirectly enhanced, thus the present invention achieves more accurate monitoring of voltage signals coupled by touch sensing electrodes and precise positioning of the touch point.

The Third Embodiment

The third Embodiment of the present invention provides a driving method of the touch panel, comprising: at a touch scanning phase, turning on a switch circuit, such that first common electrodes are connected with data lines in parallel, and a touch scanning signal is applied to the first common electrodes or second common electrodes; and at a display scan phase, turning off the switch circuit, such that the first common electrodes are disconnected with the data lines, gate lines are scanned row by row through a display scanning signal, and the display scanning signal is applied to a corresponding data line.

For the driving method of the touch panel provided by the third embodiment of the present invention, the switch circuit is provided between the first common electrodes and the data lines, and is turned on at the touch scanning phase so that the first common electrodes and the data lines are connected with each other in parallel. At the touch scanning phase, the turn-on of the switch circuit renders the parallel connection between the first common electrodes and the data lines, and then results in the reduction of the equivalent resistance of the first common electrodes, and the signal-to-noise ratio of the first common electrodes is indirectly enhanced, thus the present invention achieves more accurate monitoring of voltage signals coupled by touch sensing electrodes and precise positioning of the touch point.

The Fourth Embodiment

The fourth embodiment of the present invention provides a display device, and the display device comprises the touch panel provided by the second embodiment. Please refer to the second embodiment for details which are omitted herein. The display device can be any product or element having a display function, such as liquid crystal panel, electronic paper, OLED panel, liquid crystal television, liquid crystal display, digital photo frame, mobile phone, and flat computer.

The display provided by the fourth embodiment of the present invention comprises a touch panel, and the touch panel comprises an array substrate and a color filter substrate, the array substrate comprises a base substrate on which gate lines, data lines, first common electrodes and second common electrodes are formed, and a switch circuit is provided between the first common electrodes and the data lines, which is turned on at the touch scanning phase so that the first common electrodes and the data lines are connected with each other in parallel. At the touch scanning phase, the turn-on of the switch circuit renders the parallel connection between the first common electrodes and the data lines, and then results in the reduction of the equivalent resistance of the first common electrodes, and the signal-to-noise ratio of the first common electrodes is indirectly enhanced, thus the present invention achieves more accurate monitoring of voltage signals coupled by touch sensing electrodes and precise positioning of the touch point.

It is understandable that the above embodiments are just exemplary ones which are just intended to describe the principles of the present invention, while the present invention is not limited to these. One skilled in the art may make vairous modifications and variations to the present invention without departing from the spritis and essence of the present invention, and such variations and modifications are also deemed a part of the scope of protection of the present invention.

The invention claimed is:

1. An array substrate, comprising a base substrate, wherein the base substrate is formed with gate lines, data lines, first common electrodes and second common electrodes thereon, and the gate lines and the data lines define a plurality of pixel units each of which comprises a plurality of common electrode bases, and all of the common electrode bases are divided into a plurality of transverse electrode groups arranged in a row direction and a plurality of longitudinal electrode groups arranged in a column direction, wherein the second common electrode comprises the transverse electrode groups in the same row and metal jumper wires connecting two adjacent transverse electrode groups in the same row, the first common electrode comprise the longitudinal electrode group, and a switch circuit is provided between the first common electrode and the data line, which is turned on at a touch scanning phase so that the first common electrode and the data line are connected with each other in parallel, wherein the switch circuit comprises: a first switch sub-circuit and a second switch sub-circuit; and the first switch sub-circuit is connected with one end of the first common electrode and one end of the data line, and the second switch sub-circuit is connected with the other end of the first common electrode and the other end of the data line.

2. The array substrate according to claim 1, wherein, the first switch sub-circuit comprises: at least one first switch transistor, a first terminal of the first switch transistor is connected with one end of the data line and a second terminal of the first switch transistor is connected with the first common electrode, and the gate of the first switch transistor is connected with a switch signal line for providing a start signal at the touch scanning phase; and the second switch sub-circuit comprises: at least one second switch transistor, a first terminal of the second switch transistor is connected with one end of the data line and a second terminal of the second switch transistor is connected with the first common electrode, and the gate electrode of the second switch transistor is connected with the switch signal line.

3. The array substrate according to claim 2, wherein the data line comprise a first data line disposed corresponding to the first common electrode and a second data line disposed corresponding to the second common electrode, the first terminal of the first switch transistor is connected with one end of the first data line, and the first terminal of the second switch transistor is connected with the other end of the first data line.

4. The array substrate according to claim 3, wherein the first switch transistor corresponds to the first data line, and the second switch transistor corresponds to the first data line.

5. The array substrate according to claim 3, wherein, the first switch sub-circuit is disposed on the base substrate or disposed in a driving circuit outside the base substrate; and the second switch sub-circuit is disposed on the base substrate or disposed in the driving circuit outside the base substrate.

6. The array substrate according to claim 3, wherein, the first common electrode serves as the touch scanning electrode, and the second common electrode servers as the touch sensing electrode; or the first common electrode serves as the touch sensing electrode and the second common electrode serves as the touch scanning electrode.

7. The array substrate according to claim 4, wherein, the first switch sub-circuit is disposed on the base substrate or disposed in a driving circuit outside the base substrate; and the second switch sub-circuit is disposed on the base substrate or disposed in the driving circuit outside the base substrate.

8. The array substrate according to claim 4, wherein, the first common electrode serves as the touch scanning electrode, and the second common electrode servers as the touch sensing electrode; or the first common electrode serves as the touch sensing electrode and the second common electrode serves as the touch scanning electrode.

9. The array substrate according to claim 2, wherein,
the first switch sub-circuit is disposed on the base substrate or disposed in a driving circuit outside the base substrate; and
the second switch sub-circuit is disposed on the base substrate or disposed in the driving circuit outside the base substrate.

10. The array substrate according to claim 2, wherein,
the first common electrode serves as the touch scanning electrode, and the second common electrode servers as the touch sensing electrode; or
the first common electrode serves as the touch sensing electrode and the second common electrode serves as the touch scanning electrode.

11. The array substrate according to claim 1, wherein,
the first switch sub-circuit is disposed on the base substrate or disposed in a driving circuit outside the base substrate; and
the second switch sub-circuit is disposed on the base substrate or disposed in the driving circuit outside the base substrate.

12. The array substrate according to claim 11, wherein,
the first common electrode serves as the touch scanning electrode, and the second common electrode serves as the touch sensing electrode; or
the first common electrode serves as the touch sensing electrode and the second common electrode serves as the touch scanning electrode.

13. The array substrate according to claim 1, wherein,
the first common electrode serves as the touch scanning electrode, and the second common electrode servers as the touch sensing electrode; or
the first common electrode serves as the touch sensing electrode and the second common electrode serves as the touch scanning electrode.

14. The array substrate according to claim 1, wherein,
the first common electrode serves as the touch scanning electrode, and the second common electrode servers as the touch sensing electrode; or
the first common electrode serves as the touch sensing electrode and the second common electrode serves as the touch scanning electrode.

15. A touch panel, comprising an array substrate and a color filter substrate disposed opposite to each other, wherein the array substrate is according to the array substrate of claim 1.

* * * * *